United States Patent
Takahashi

(10) Patent No.: US 9,992,361 B2
(45) Date of Patent: Jun. 5, 2018

(54) INPUT DEVICE HAVING PUSH-KEYS, AND IMAGE FORMING APPARATUS HAVING THE SAME

(71) Applicant: CANON KABUSHIKI KAISHA, Tokyo (JP)

(72) Inventor: Satoru Takahashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/646,553

(22) Filed: Jul. 11, 2017

(65) Prior Publication Data

US 2017/0310833 A1   Oct. 26, 2017

Related U.S. Application Data

(62) Division of application No. 15/170,191, filed on Jun. 1, 2016, now Pat. No. 9,742,939.

(30) Foreign Application Priority Data

Jun. 2, 2015  (JP) .................................. 2015-111982
Apr. 11, 2016  (JP) .................................. 2016-078999

(51) Int. Cl.
G03G 15/00 (2006.01)
H04N 1/00 (2006.01)

(52) U.S. Cl.
CPC ............................... H04N 1/00384 (2013.01)

(58) Field of Classification Search
CPC ................................................ H04N 1/00384
USPC ........................................................ 399/81
See application file for complete search history.

(56) References Cited

U.S. PATENT DOCUMENTS

| | | | |
|---|---|---|---|
| 7,629,548 B2 | 12/2009 | Pippel et al. | |
| 7,888,614 B2 | 2/2011 | Pippel et al. | |
| 8,847,089 B2 | 9/2014 | Fujibayashi | |
| 9,742,939 B2 * | 8/2017 | Takahashi | .......... H04N 1/00564 |
| 2007/0013787 A1 | 1/2007 | Pippel et al. | |
| 2010/0096246 A1 | 4/2010 | Pippel et al. | |

FOREIGN PATENT DOCUMENTS

| | | |
|---|---|---|
| JP | 2004-281210 A | 10/2004 |
| JP | 2008-047464 A | 2/2008 |
| JP | 2008-299444 A | 12/2008 |
| JP | 2012-084543 A | 4/2012 |

* cited by examiner

*Primary Examiner* — William J Royer
(74) *Attorney, Agent, or Firm* — Fitzpatrick, Cella, Harper & Scinto

(57) ABSTRACT

A push type key includes a base including a main body, a key portion having an operation surface, first and second elastic portions connecting between the main body and the key portion, and an electrical equipment substrate provided on a back side of the base. The substrate includes an operating portion acted on by the key portion when the key portion moves. The first and second elastic portions have symmetrical configurations with respect to a phantom line passing through a center of the key portion, as seen perpendicularly to the operation surface. The operating portion is disposed at a position closer to the first elastic portion than to the second elastic portion. The base is provided with a third elastic portion connecting the key portion with the main body or with the second elastic portion in a side of the second elastic portion with respect to the phantom line.

20 Claims, 10 Drawing Sheets

(a)
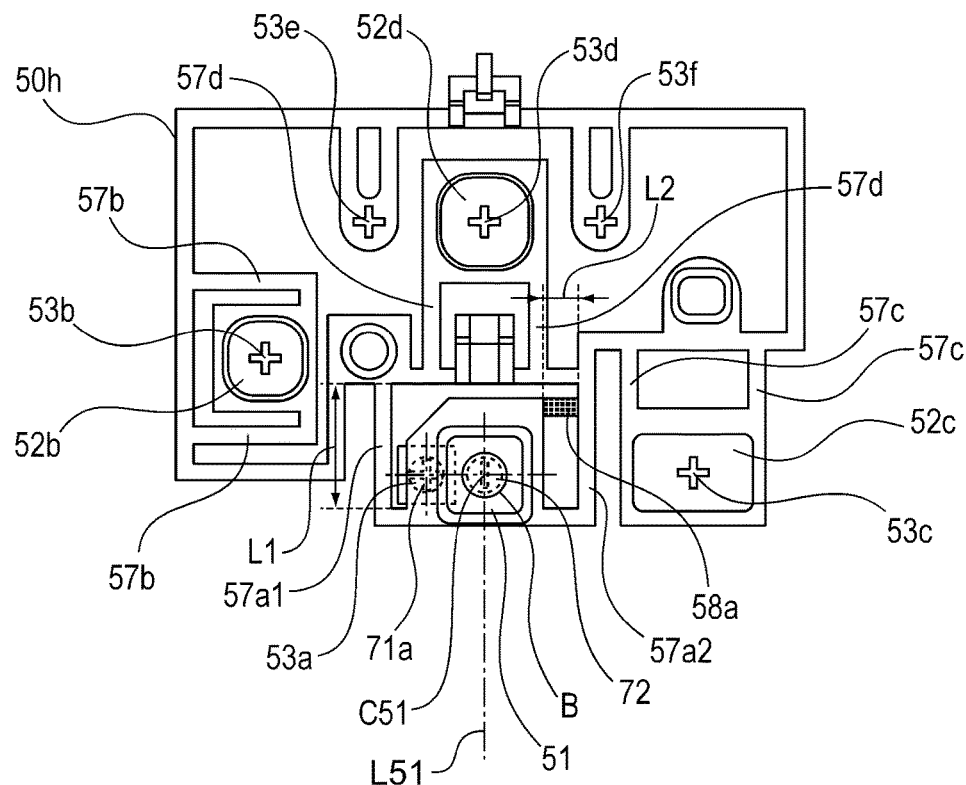
(b)
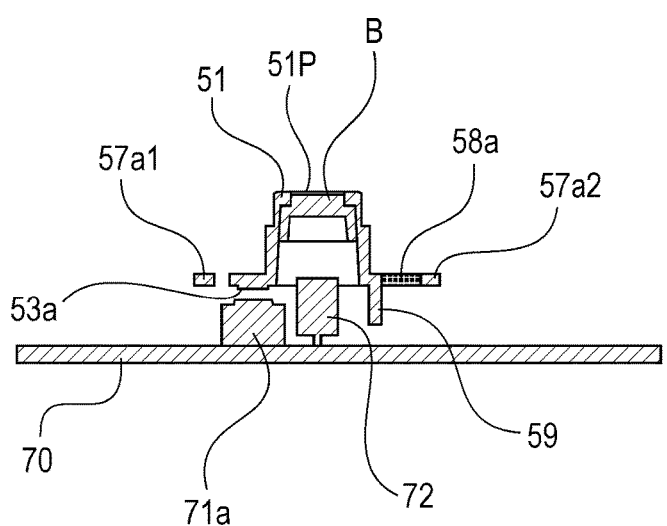
Fig. 5

(a)
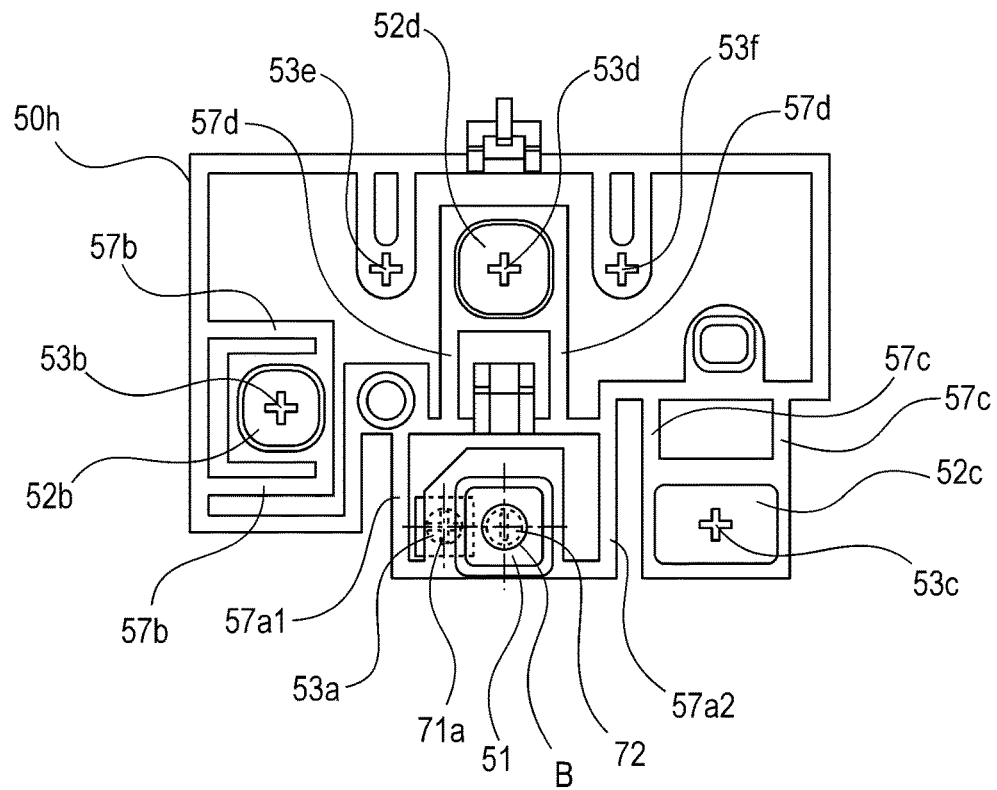
(b)
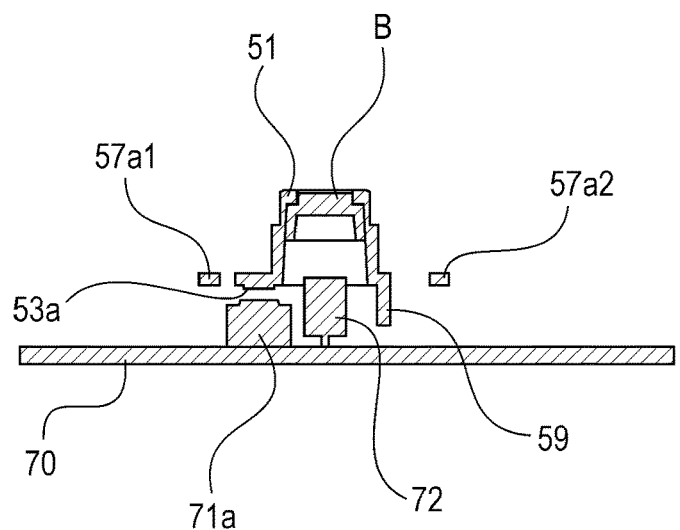
Fig. 6

(a)
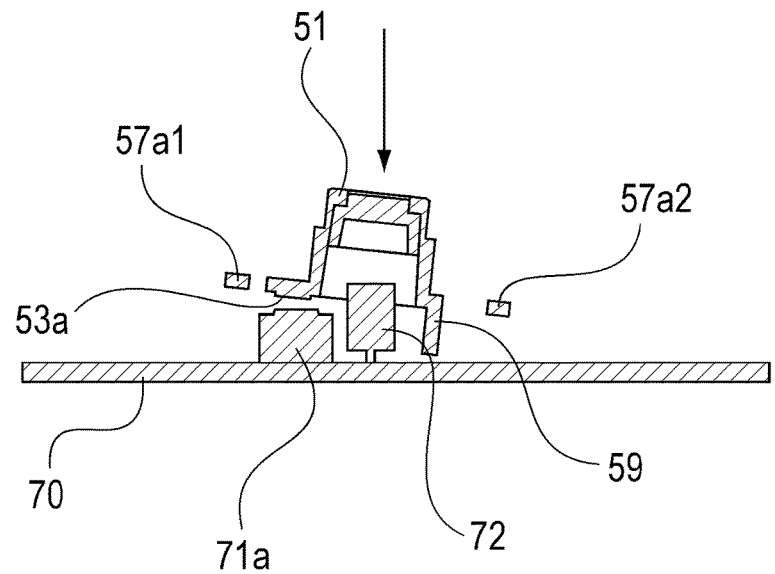
(b)
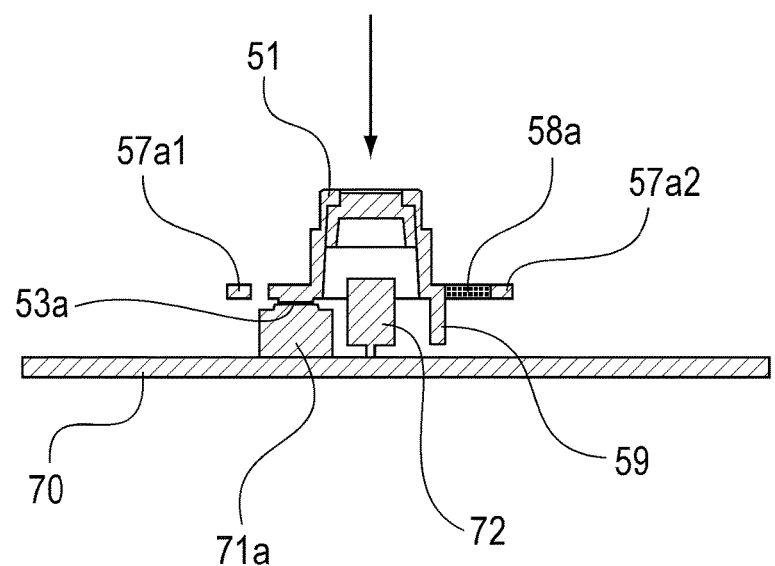
Fig. 7

INPUT DEVICE HAVING PUSH-KEYS, AND IMAGE FORMING APPARATUS HAVING THE SAME

This is a divisional of U.S. patent application Ser. No. 15/170,191, filed Jun. 1, 2016.

FIELD OF THE INVENTION AND RELATED ART

The present invention relates to an input device for a user to operate an apparatus. It relates to also an image forming apparatus such as a copying machine, a printer, or the like, which is equipped with the input device.

Here, an image forming apparatus is an apparatus for forming an image on recording medium with the use of an electrophotographic method, for example. As for examples of electrophotographic image forming apparatus, they include electrophotographic copying machines, electrophotographic printing machines (laser beam printer, LED printers, and the like), facsimile machines, word processors, and the like.

Some image forming apparatuses are equipped with an input device having push-keys which are to be used by a user to operate the apparatus. As a push-key is pressed by a user, a corresponding switch within the input device is turned on or off so that a control section of the image forming apparatus detects the pressed key, and carries out a process which corresponds to the pressed key.

Generally speaking, an input device having push-keys has: a base member having key portions which a user touches; and an electric circuit board having portions (switches or the likes) on which the keys act. It is structured so that the base member is laid upon the electric circuit board. The base member is molded of resin, in one-piece. The key portions of the base member are in connection to a main portion of the base member through branch-like elastic portions. The input device is structured so that as a user presses one of the key portions, the elastic portions deform relative to the main portion of the base member, allowing thereby the key portion to act on the switch or the like on the electric circuit board (Japanese Laid-open Patent Application No. 2008-299444).

There is also known an input device having such keys that can be illuminated to inform a user of the state of an apparatus, degree of progression of an on-going operation, and/or the like. Its electrical circuit board is provided with light emitting elements such as LEDs. It is structured so that the keys are illuminated with the LEDs or the like from within the keys (Japanese Laid-open Patent Application No. 2004-281210).

By the way, in order to make the luminous keys better in visibility while they are illuminated, it is desired to position a light emitting element such as an LED directly below the portion of the luminous key, which is to be illuminated. Further, for the reason related to design, many input devices are structured so that the area of the key, which is to be illuminated, coincides with the center portion of the key.

In the case of an input device structured as described above, a light emitting element is disposed directly below the center portion of the key. Therefore, the switch which is to be pressed by the pressure applying portion of the key cannot be placed directly below the center portion of the key. Thus, the key feels inferior in tactility.

As described above, in the case of an input device structured so that a "switch or the like, to which pressure is applied by the key" cannot be placed directly below the center portion of the key, there is an issue that the key is inferior in tactility. By the way, even if an apparatus does not employ luminous keys, as long as it is structured so that its portion to which pressure is applied by the key cannot be positioned directly below the center portion of the key, it suffers from the same issue as the abovementioned input devices for an image forming apparatus.

SUMMARY OF THE INVENTION

The present invention was made in consideration of the above-described issue. Thus, the primary object of the present invention is to provide an input device having push-keys which feel better to a user in tactility as the user presses the keys than a conventional input device. It is also to provide an image forming apparatus having the input device.

According to an aspect of the present invention, there is provided an inputting device having a push type key, said inputting device comprising a base member including a main body portion, a key portion having an operation surface to be pushed by an operator, a first elastic portion and a second elastic portion which connect between said main body portion and said key portion; and an electrical equipment substrate provided on a back side of said base member, said electrical equipment substrate including an operating portion acted on by said key portion when said key portion moves; wherein said first and second elastic portions have symmetrical configurations with respect to a phantom line passing through a central portion of said key portion, as seen in a direction perpendicular to said operation surface, wherein said operating portion is disposed at a position closer to said first elastic portion than to said second elastic portion, and wherein said base member is provided with a third elastic portion connecting said key portion with said main body portion or with said second elastic portion in a side of said second elastic portion with respect to the phantom line.

Further features of the present invention will become apparent from the following description of exemplary embodiments with reference to the attached drawings.

Figure 3:
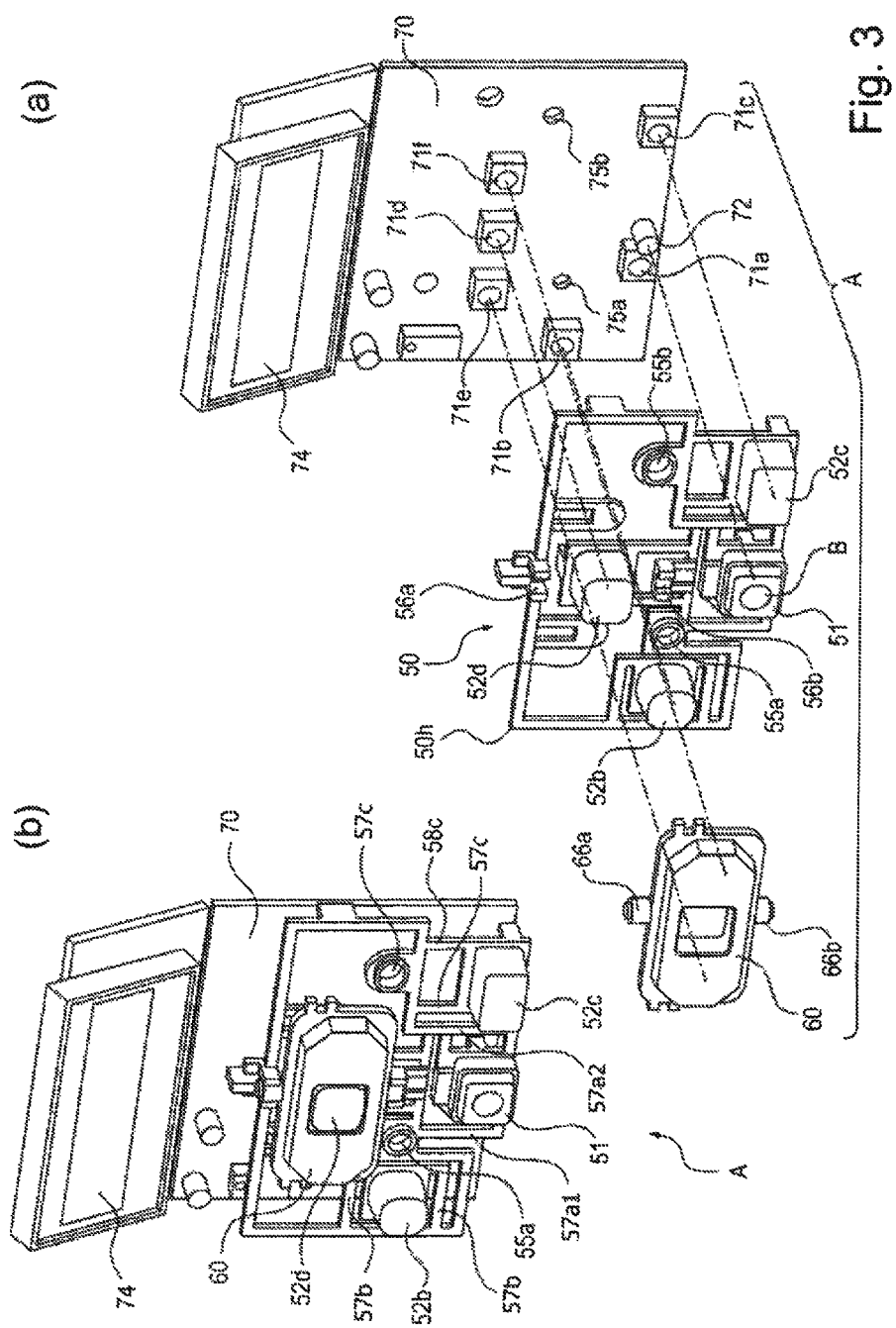

Part (a) of FIG. 3 and part (b) of FIG. 3 are perspective views of an input device in a first embodiment before and after, respectively, the disassembling of the input device. They are for describing the structure of a key portion of the input device.

Figure 4:
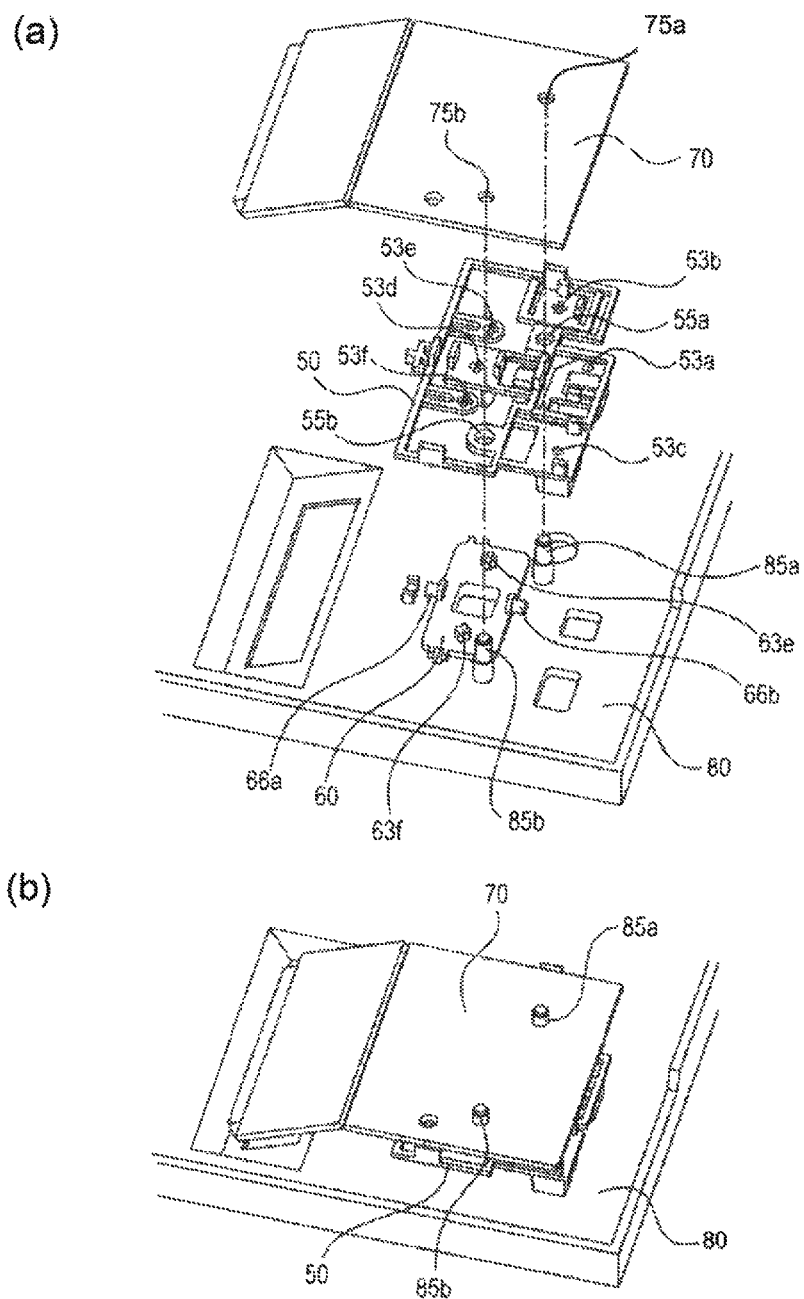

Parts (a) and (b) of FIG. 4 are perspective views of the input device and its top cover. They are for describing how the input device is attached to the top cover.

Part (a) of FIG. 5 is a top view of an input key member of the input device, and part (b) of FIG. 5 is a sectional view of one of a luminous key portion, and its adjacencies, of the input device.

Part (a) of FIG. 6 is a top view of a key portion of a comparative input device, and part (b) of FIG. 6 is a sectional view of one of a luminous key portion.

Part (a) of FIG. 7 is a sectional view of one of the key portions of the comparative input device, when the key portion is being pressed, and part (b) of FIG. 7 is a sectional view of one of the luminous key portions of the input device in this embodiment, when a switch section of the input device is being pressed by the key portion.

Figure 8:
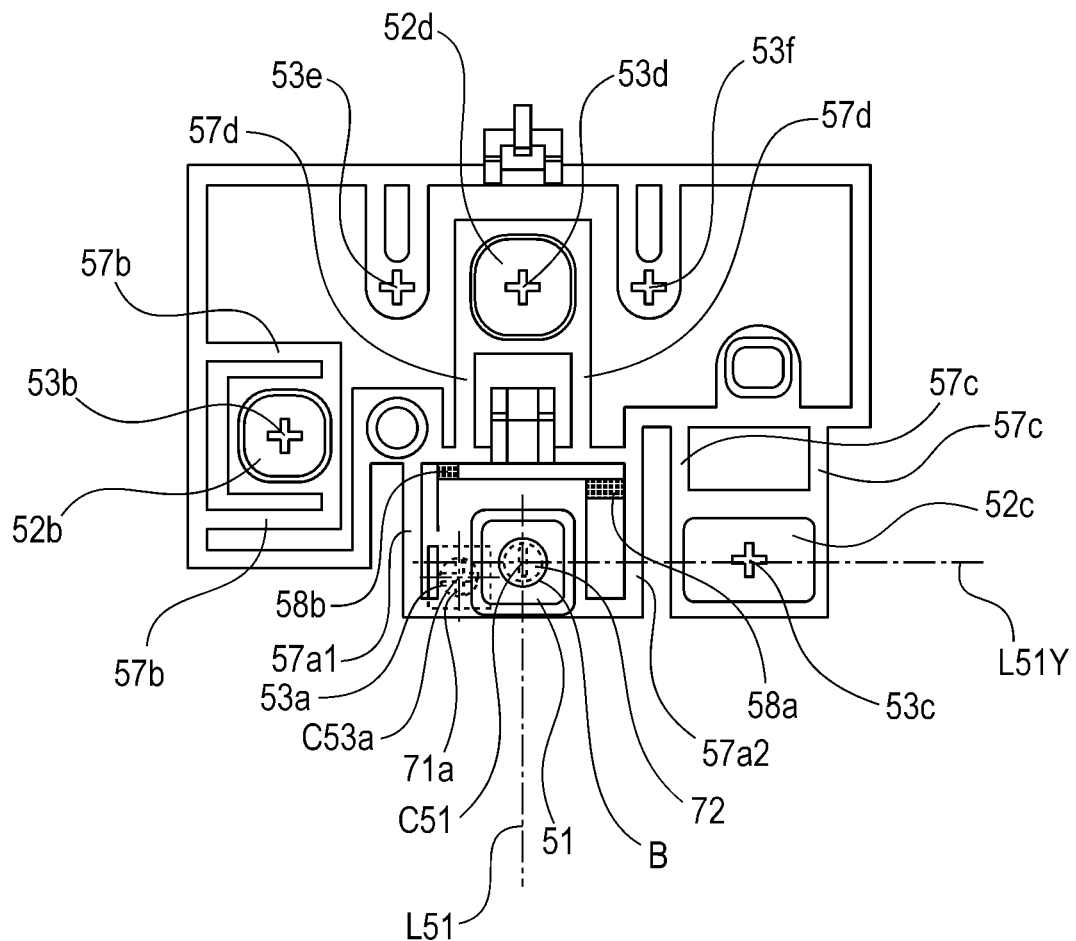

FIG. 8 is a top view of an input key member in another embodiment of the present invention.

Figure 9:
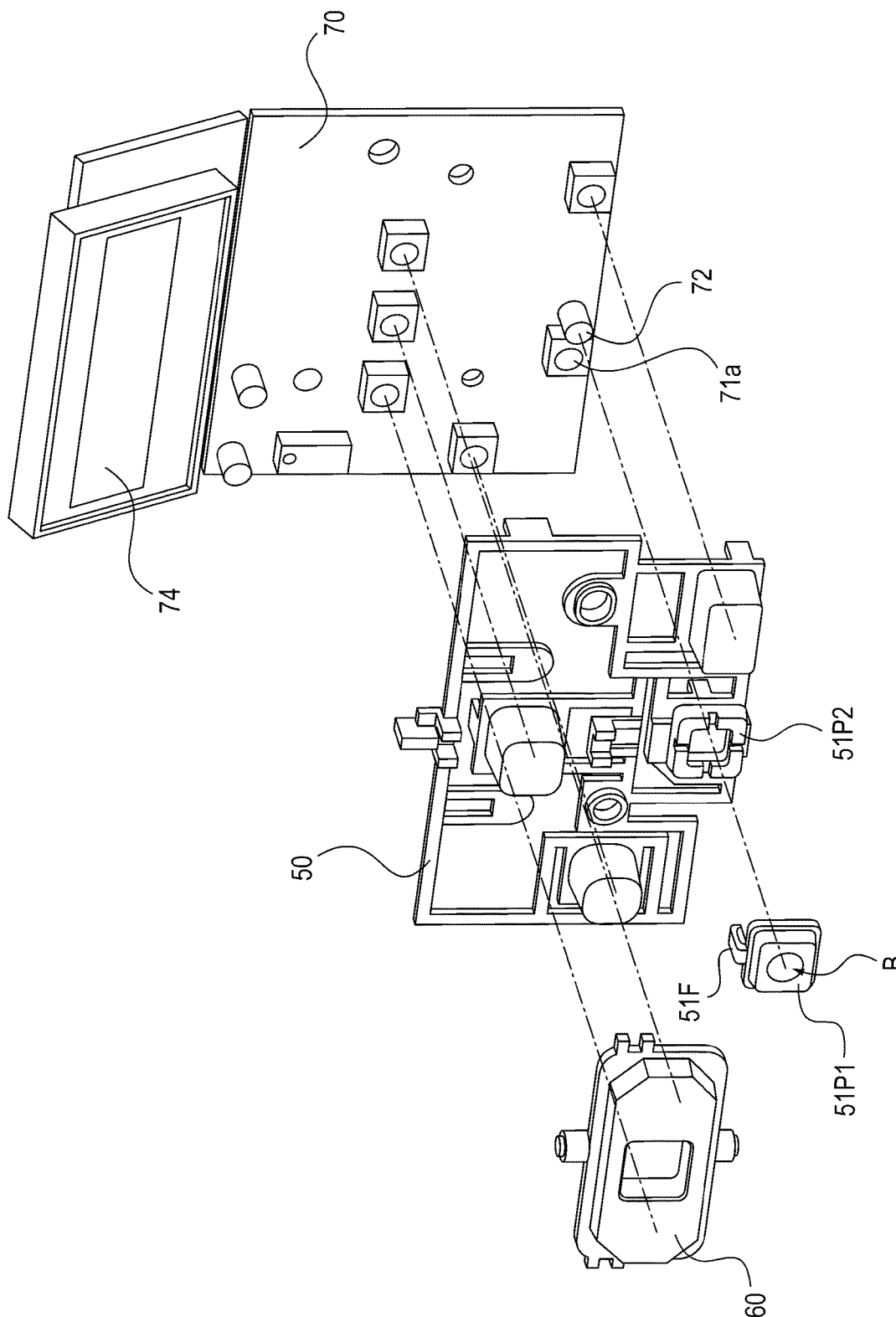

FIG. 9 is an exploded perspective view of the input device in another embodiment of the present invention. It is for describing the structure of an input key member.

Figure 10:
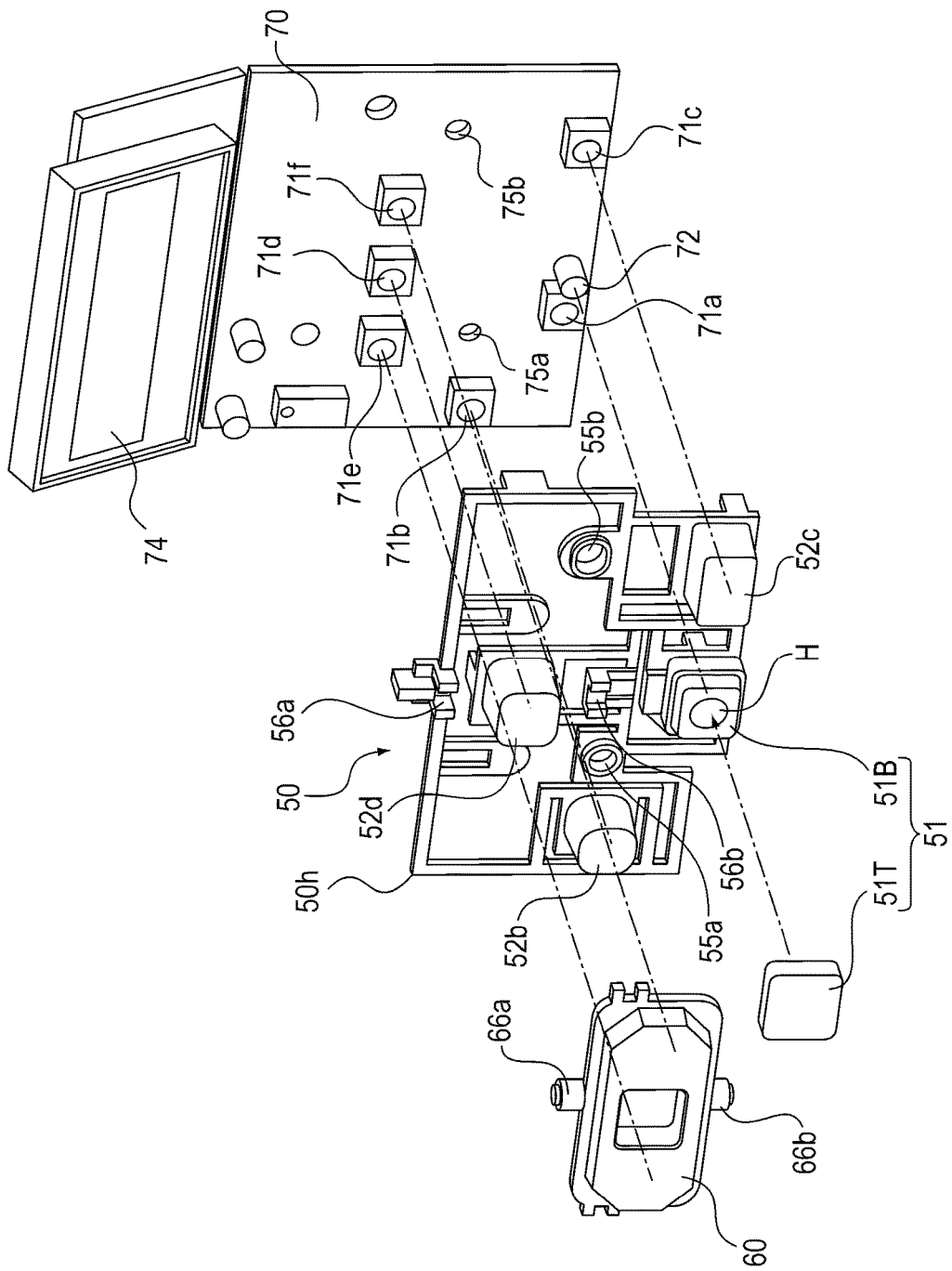

FIG. 10 is an exploded view of the input device in another embodiment of the present invention. It is for describing the structure of an input key member.

DESCRIPTION OF THE EMBODIMENTS

Hereinafter, a few of the preferable embodiments of the present invention are described in detail. However, the measurements, materials, and shapes of the structural components of the input devices and image forming apparatuses in the following embodiments of the present invention, and their positional relationship among them, are not intended to limit the present invention in scope, unless specifically noted. They are to be modified as necessary according to the structure of the apparatus to which the present invention is applied, and also, various conditions under which the apparatuses are operated.

Embodiment 1

First, referring to FIGS. 1-7(b), an image forming apparatus in a first embodiment of the present invention is described.

By the way, electrophotographic image forming apparatuses in the following embodiments of the present invention are electrophotographic full-color image forming apparatuses, in which four process cartridges are removably installable. However, the following embodiments are not intended to limit the present invention in the number of process cartridges which the apparatuses employ for the formation of a full-color image. That is, the number is set as necessary. For example, when the apparatuses are used for forming a monochromatic image, the number of process cartridge which the apparatuses employ is one.

Further, the image forming apparatus in each of the following embodiments which will be described hereafter is a printer. However, these embodiments are not intended to limit the present invention in the type of image forming apparatus to which the present invention is applicable. That is, the present invention is also applicable to other image forming apparatuses than printers. For example, the present invention is applicable to copying machines, facsimileing machines, and multifunction machines capable of performing functions of two or more of the abovementioned machines.

(General Structure of Image Forming Apparatus)

Figure 1:
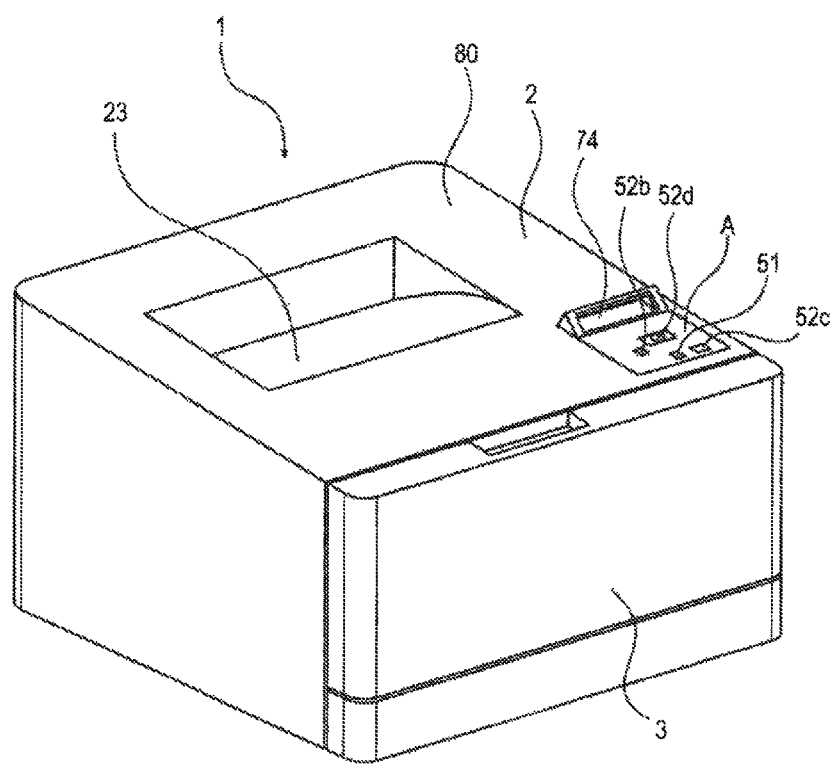
FIG. 1 is a perspective view of an example of an image forming apparatus to which the present invention is applicable.
Figure 2:
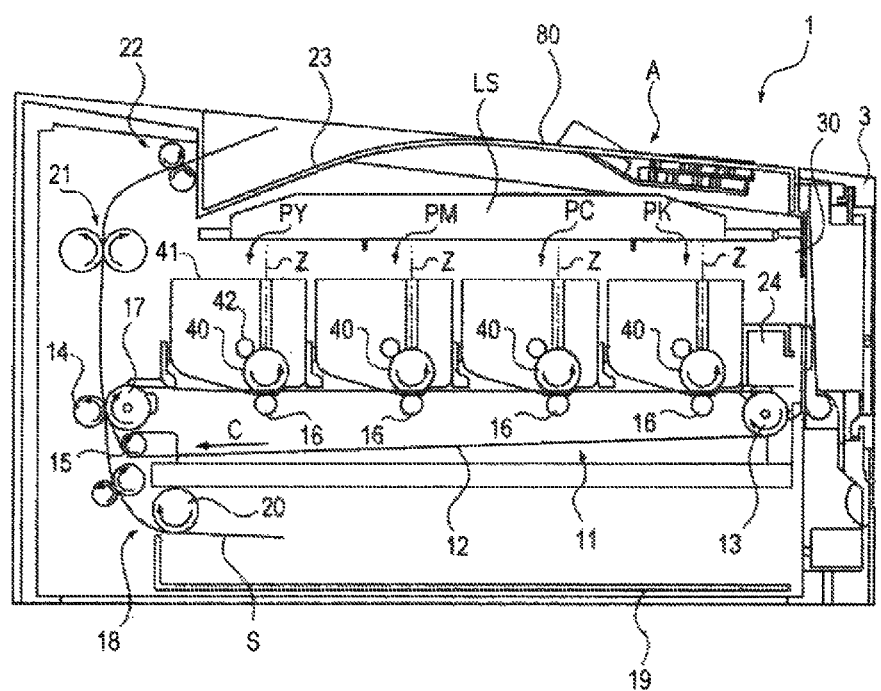
FIG. 2 is a schematic sectional view of the image forming apparatus shown in FIG. 1.

To begin with, an image forming apparatus 1 to which the present invention is applicable is described about its general structure. FIG. 1 is an external perspective view of the image forming apparatus 1 in this embodiment. FIG. 2 is a schematic sectional view of the image forming apparatus 1 in this embodiment.

This image forming apparatus 1 is a full-color laser printer based on four primary colors. It forms a color image on a sheet S of recording medium with the use of an electrophotographic process. It has an image forming portion structured as follows. That is, it employs a process cartridge system. It is structured so that process cartridges (which hereafter may be referred to simply as cartridges) are removably installable in its main assembly 2.

Here, regarding the orientation of the image forming apparatus 1, the side having a door 3 is referred to as "front" side, and the opposite side from the front side is referred to as "rear" (back) side. Further, the right side of the image forming apparatus 1 as seen from the front side is referred to as "drive" side, whereas the left side is referred to as "non-drive" side.

In the main assembly 2 of the image forming apparatus 1, four cartridges, more specifically, first to fourth cartridges PY, PM, PC and PK are removably mountable in such a manner that they horizontally align. It is structured so that as the door 3 is opened, a cartridge tray 24 can be pulled out frontward from the main assembly 2 through an opening 30 of the apparatus main assembly 2 to replace the cartridges PY, PM, PC and PK. To the first to fourth cartridges (PY, PM, PC and PK), rotational driving force is transmitted from a driving force output portion (unshown) of the main assembly 2. Further, to each of the first to fourth cartridges (PY, PM, PC and PK), bias voltages (charge bias, development bias, and the like) are supplied from the bias voltage sources (unshown) of the main assembly 2.

Each of the first to fourth cartridges (PY, PM, PC and PK) has its own electrophotographic image forming system. The four cartridges are similar in structure, although they are different in the color of the developer (which hereafter may be referred to as toner) they use. The first cartridge PY contains yellow (Y) toner. It forms a yellow (Y) toner image on the peripheral surface of a photosensitive drum 40. The second cartridge PM contains magenta (M) toner. It forms a magenta (M) toner image on the peripheral surface of the photosensitive drum 40. The third cartridge PC contains cyan (C) toner. It forms a cyan (C) toner image on the peripheral surface of the photosensitive drum 40. The fourth cartridge PK contains black (K) toner. It forms a black (K) toner image on the peripheral surface of the photosensitive drum 40.

Above the combination of the first to fourth cartridges (PY, PM, PC and PK), a laser scanner unit LS is provided as an exposing means. This laser scanner unit LS outputs a beam Z of laser light while modulating the beam Z according to the information of the image to be formed. As the beam Z of laser light is outputted, it projects through an exposure window of the cartridge P, and scans (exposes) the peripheral surface of the photosensitive drum 40.

Below the combination of the first to fourth cartridges (PY, PM, PC and PK), an intermediary transfer unit 11 is disposed as a transferring member. The intermediary transfer unit 11 has a driver roller 13, a turn roller 17, and a tension roller 15. It has also a flexible transfer belt 12, which is suspended by the abovementioned three rollers 13, 17 and 15.

The photosensitive drum 40 of each of the first to fourth cartridges (PY, PM, PC and PK) is in contact with the upwardly facing portion of the outwardly facing surface of the transfer belt 12. The area of contact between the photosensitive drum 40 and transfer belt 12 is a primary transfer portion. On the inward side of the loop which the transfer belt 12 forms, four primary transfer rollers 16 are disposed so that they oppose the four photosensitive drums 40 one for one.

Against the turn roller 17, a secondary transfer roller 14 is kept pressed with the presence of the transfer belt 12 between the two rollers 17 and 14. The area of contact between the transfer belt 12 and secondary transfer roller 14 is a secondary transfer portion.

Below the intermediary transfer unit 11, a sheet feeding-conveying unit 18 is disposed. This sheet feeding-conveying unit 18 has a sheet feeding-conveying tray 19 in which sheets S of recording medium are stored in layers, and a sheet feeding-conveying roller 20 which feeds the sheets S from the sheet feeding-conveying tray 19 into the main assembly 2, one by one, and conveys each sheet S further into the main assembly 2.

Referring to FIG. 2, in the top-left portion of the main assembly 2, a fixation unit 21 and a discharge unit 22 are disposed. A part of the top surface of the main assembly 2 is utilized as a delivery tray 23. As each sheet S of recording medium is conveyed through the abovementioned fixation unit 21, the toner image on the sheet S is fixed to the sheet S by a fixing means, with which the fixation unit 21 is provided. Then, the sheet S is discharged by the discharge unit 22 into the abovementioned delivery tray 23.

Next, the operation carried out by the image forming apparatus 1 structured as described above to form a full-color image is described.

The photosensitive drum 40 in each of the first to fourth cartridges (PY, PM, PC and PK) is rotationally driven at a preset speed (direction indicated by an arrow mark in FIG. 2; counterclockwise direction). The transfer belt 12 is rotationally driven so that it moves in the same direction (direction indicated by arrow mark C in FIG. 2) in the area of contact between photosensitive drum 40 and transfer belt 12 at a speed which corresponds to the speed of the photosensitive drum 40.

The laser scanner unit LS scans (exposes) the peripheral surface of each photosensitive drum 40 with the beam Z of laser light it emits while modulating the beam Z with image formation signals which correspond to monochromatic images into which the image to be formed was separated. Consequently, an electrostatic latent image, which reflects the image formation signals, is effected on the peripheral surface of the photosensitive drum 40. Then, the latent image is developed by a development roller 42, which is in a developing device 41 and is rotationally driven at a preset speed.

Through an electrophotographic image formation process such as the above-described one, a yellow (Y) toner image, which corresponds to the yellow component of the full-color image to be formed, is formed on the peripheral surface of the photosensitive drum 40 in the first cartridge PY. This toner image is transferred (primary transfer) onto the transfer belt 12.

Similarly, on the photosensitive drum 40 of the second cartridge PM, a magenta (M) toner image which corresponds to the magenta (M) component of the full-color image to be formed, is formed. This toner image is transferred (primary transfer) onto the transfer belt 12, in a manner to be layered upon the yellow (Y) toner image which has just been transferred onto the transfer belt 12.

Similarly, on the photosensitive drum 40 of the third cartridge PC, a cyan (C) toner image which corresponds to the cyan (C) component of the full-color image to be formed, is formed. This toner image is transferred (primary transfer) onto the transfer belt 12, in a manner to be layered upon the yellow (Y) and magenta (M) toner images, which have just been transferred onto the transfer belt 12.

Similarly, on the photosensitive drum 40 of the fourth cartridge PK, a black (K) toner image which corresponds to the black (K) component of the full-color image to be formed, is formed. This toner image is transferred (primary transfer) onto the transfer belt 12, in a manner to be layered upon the yellow (Y), magenta (M), and cyan (C) toner images, which have just been transferred onto the transfer belt 12.

Consequently, an unfixed full-color toner image is synthetically formed of yellow (Y), magenta (M), cyan (C), and black (K) monochromatic images, on the transfer belt 12.

Meanwhile, the sheet feeding-conveying roller 20 begins to be driven with preset timing, whereby the sheets S stored in layers in the sheet feeding-conveying tray 19 begin to be fed into the main assembly 2, while being separated one by one, and to be guided into the secondary transfer nip, which is the area of contact between the secondary transfer roller 14 and transfer belt 12, to be conveyed through the nip.

While each sheet S of recording medium is conveyed through the secondary transfer nip, the four toner images which are different in color and are layered on the transfer belt 12 are transferred together onto the sheet S as if they are peeled away from the transfer belt 12.

Next, an input device (input device having push-keys) is described about its structure. Referring to FIG. 1, the main assembly 2 of the image forming apparatus 1 is provided with an input device A through which the image forming apparatus 1 receives inputs from a user. The input device A is disposed so that its top surface is exposed upward. In this embodiment, the input device A is an integral part of a top cover 80 of the main assembly 2.

The input device A is provided with a display 74, and keys 51, 52b, 52c and 53d which are operable by a user. Among the four keys, the key 51 can be illuminated from its inward side. It is for a user to connect the image forming apparatus 1 to a wireless LAN, or disconnect the image forming apparatus 1 from the wireless LAN. That is, as the key 51 is pressed once by a user, not only is the image forming apparatus 1 connected to the wireless LAN, but also, the key 51 is illuminated to confirm that the image forming apparatus 1 is in connection to the wireless LAN. On the other hand, as the key 51 is pressed while the key 51 is luminous, the key 51 stops being luminous, and the image forming apparatus 1 becomes disconnected from the wireless LAN. Disconnecting the image forming apparatus 1 from the wireless LAN reduces the image forming apparatus 1 in electric power consumption.

Referring to parts (a) and (b) of FIG. 3 and parts (a) and (b) of FIG. 4, the input device A is an assembly of an input key member 50 (base member), and an electric circuit board 70 on which the input key member 50 is layered. The entirety of the input key member 50 (base member) is molded in one-piece, of a resinous substance. It has a main portion 50h, and key portions 51, 52b, 52c and 52d having an area to be pressed by a user. Each key portion 51, 52b, 52c and 52d is connected to the main portion 50h with elastic portions, as will be described later. The circuit electric board 70 is provided with switches (on which key portions act) 71a-71f, four of which correspond to the key portions 51, 52b, 52c and 52d, respectively, and a light emitting element 72 for illuminating the luminous key portion 51. The switches 71a-71f are sensors that detect whether or not the corresponding key portions 51, 52b, 52c and 52d have just been pressed. One of these switches, more specifically, the switch 71a, corresponds to the luminous key portion 51. The switch 71b corresponds to the key portion 52b. The switch 71c corresponds to the key portion 52c. The switch 71d corresponds to the key portion 52d. The switches 71e and 71f correspond to a multifunction input key 60. As any of these keys is pressed by a user, the input device A informs the control portion (unshown) which input key has just been pressed. Then, the control portion presents the information related to the pressed key on a display 74. Further, it displays on the display 74, information regarding whether or not the image forming apparatus 1 is in connection to the wireless LAN, in response to whether or not the light emitting element 72 is on (whether or not switch 71a is on). With use of the input device A, a user can conversationally choose various functions of the image forming apparatus 1.

Referring to part (a) of FIG. 5, the main portion 50h of the input key portion member 50 (base member) is connected to the luminous key portion 51 and non-luminous key portions 52b-52d by elastic portions 57a1, 57a2-57d. That is, the main portion 50h, key portions 52b-52d, and elastic portions 57a-57d are integral parts of a one-piece component. All the key portions except for the luminous key portion 51 are connected to the main portion 50h by two elastic portions. More specifically, the key portion 52b is connected to the main portion 50h by two elastic portions 57b. The key portion 52c is connected to the main portion 50h by two elastic portions 57c. The key portion 52d is connected to the main portion 50h by two elastic portions 57d. To the main portion 50h, the base portion of each elastic portion is connected. As a key portion is pressed, the corresponding elastic portions elastically deform, allowing the key to move relative to the main portion 50h to press on the corresponding switch.

The key portion 51 is connected to the main portion 50h by first and second elastic portions 57a1 and 57a2. As the key portion 51 is seen from the direction which is perpendicular to a control panel 51P, the first and second elastic portions 57a1 and 57a2 are symmetrically shaped and positioned with reference to a hypothetical line L51 which coincides with a center C51 of the key portion 51. In this embodiment, other elastic portions 57a1, 57a2-57d are also symmetrically shaped and positioned with reference to a hypothetical line which coincides with the center of the corresponding key.

Further, the surface of the input key member 50 (base member), which faces the electric circuit board 70, is provided with pressing sections 53a-53d for pressing down the switches 71a-71d. The pressing section 53a is for pressing the switch 71a, and the pressing section 53b is for pressing the switch 71b. The pressing section 53c is for pressing the switch 71c, and the pressing section 53d is for pressing the switch 71d. Also, the pressing section 53e is for pressing the switch 71e, and the pressing section 53f is for pressing the switch 71f.

Referring to parts (a) and (b) of FIG. 4, the input key member 50 (base member) having keys has first positioning holes 55a and 55b, whereas the top cover 80 has positioning bosses 85a and 85b. As the input key member 50 (base member) is attached to the top cover 80 so that the positioning bosses 85a and 85b fit into the first positioning holes 55a and 55b, respectively, the input key member 50 (base member) is precisely positioned relative to the top cover 80.

Further, the electrical circuit board 70 has second positioning holes 75a and 75b. As the electrical circuit board 70 is attached to the top cover 80 so that the positioning bosses 85a and 85b fit into the second positioning holes 75a and 75b, the electrical circuit board 70 is precisely positioned relative to the top cover 80.

Referring to parts (a) and (b) of FIG. 3, and parts (a) and (b) of FIG. 4, the multifunction input key 60 is provided with a pair of rotational shafts 66a and 66b, and a pair of pressing sections 63e and 63f. Referring to part (a) of FIG. 3, the input key member 50 is provided with a pair of bearings 56a and 56b, which correspond to the rotational shafts 66a and 66b of the multifunction input key 60, and by which the rotational shafts 66a and 66b are borne, respectively. As the left or right side of the multifunction input key 60 is pressed, the multifunction input key 60 pivotally moves about the rotational shafts 66a and 66b, becoming thereby tilted. Consequently, the switches 71e and 71f on the electrical circuit board 70 are pressed down by the pressing sections 63e or 63f, respectively.

Next, the structure of the luminary (or luminous) key portion 51 is described in detail. Part (a) of FIG. 5 is a top view of the input key member 50, and part (b) of FIG. 5 is a sectional view of the input key member 50. Part (a) of FIG. 5 shows the pressing section 53a, switch 71a, and light emitting element 72, which are contoured by broken lines.

The center portion of the luminary key portion 51 is provided with a round transparent area B, which is formed of transparent resin. On the other hand, other portions (main portion 50h, key portions 51, 52b, 52c, 52d) of the input key member 50 (base member) than the center portion of the luminary key portion 51 are formed of opaque resin. The transparent area B is formed as an integral part of the input key member 50 (base member), which is molded in one-piece. In this embodiment, the material for the transparent area B of the input key member 50 (base member) is PS (Polyester), whereas the material for the other portions (opaque portions) of the input key member 50 (base member) is ABS (Acrylonitrile Butadiene, Styrene).

The light emitting element 72 on the electric circuit board 70 is directly below the transparent area B of the luminary key portion 51. More specifically, the light emitting element 72 is positioned so that in terms of the direction perpendicular to the control panel 51P, the center of the light emitting element 72 aligns with the center of the center C51 of luminary key portion 51. Therefore, the switch 71a and pressing section 53a, which correspond to the luminary key portion 51, cannot be positioned directly below the luminary key portion 51. That is, as the luminary key portion 51 is seen from the direction perpendicular to the control panel 51P, the light emitting element 72 is positioned closer to the center C51 of the luminary key portion 51 than the switch 71a (on which pressing section 53a acts). Therefore, the switch 71a and pressing section 53a, which correspond to the luminary key portion 51, are positioned so that they are offset leftward relative to the light emitting element 72, as shown in part (a) of FIG. 5. Also as the luminary key portion 51 is seen from the direction perpendicular to the control panel 51P, the switch 71a (on which pressing section 53a acts) is positioned so that it is closer to the first elastic portion 57a1 than the second elastic portion 57a2.

Further, the luminary key portion 51 is supported not only by the first and second elastic portions 57a1 and 57a2, but also, by an elastic portion 58a (third elastic portion), which is the hatched portion in the drawing. Here, the first and second elastic portions 57a1, 57a2, and the elastic portions 57b-57d which support the input keys 52b-52d, are shaped and positioned so that they are symmetrical with reference to either a vertical line which coincides with the center of the corresponding key, or a horizontal line which coincides with center of the corresponding key. In comparison, there is no elastic portion which is shaped and positioned to be symmetrical with reference to a vertical or horizontal line which coincides with the center of the corresponding key. In this embodiment, the third elastic portion 58a is positioned to connect the key portion 51 to the second elastic portion 57a2. However, it may be positioned to connect the key portion 51 to the main portion 50h. When all is said and done, the input key member 50 (base member) is provided with the third elastic portion 58a, which connects the key portion 51 to the main portion 50h or the second elastic portion 57a2. Further, the third elastic portion 58a is on the second elastic portion 57a2 side of the hypothetical line L51.

Here, it is desired that the length L2 of the third elastic portion 58a is less than the length L1 of the first elastic portion 57a1 (57a2). The provision of the third elastic portion 58a (which preferably satisfies inequality: L1>L2) increases in rigidity, the elastic portion (on second elastic portion 57a2 side) which is on the opposite side from the pressing section 53a. Therefore, it is possible to prevent the problem that as the third elastic portion 58a is made to press on the switch 71a by the pressing of the key portion 51, the key portion 51 tilts.

Part (b) of FIG. 5 is a sectional view of the luminary key portion 51 and its adjacencies. The luminary key portion 51 is provided with a bumping portion 59, which is on the opposite portion of the luminary key portion 51 from the pressing section 53a, with reference to the transparent area B of the luminary key portion 51. Thus, it is possible to prevent the problem that as the luminary key portion 51 is pressed hard by a user, the switch 71a is damaged.

At this time, what occurs to the input device A in this embodiment as the luminary key portion 51 is pressed is described with reference to a comparative example of an input device. Part (a) of FIG. 6 is a top view of the comparative example of input key member 50, and part (b) of FIG. 6 is a sectional view of the comparative example of input key member 50. In the case of the comparative example of input key member 50, it is only the first and second elastic portions 57a1 and 57a2 that supports the luminary key portion 51 (third elastic portion 58a is not provided). Part (a) of FIG. 7 is a sectional view of the luminary key portion 51 and its adjacencies in the comparative example of input device A, when the luminary key portion 51 is being pressed. Part (b) of FIG. 7 is a sectional view of the luminary key portion 51 and its adjacencies in the input device A in this embodiment when the luminary key portion 51 is being pressed.

In the case of the comparative example of input device A shown in part (a) of FIG. 7, as a user presses on the luminary key portion 51, the pressing section 53a comes into contact with a part of the switch 71a, and the luminary key portion 51 is made to pivotally move (tilt) about the point of contact between the pressing section 53a and switch 71a. Thus, it is possible that the amount by which force is applied to the switch 71a by the pressing section 53a of the luminary key portion 51 will be insufficient, and therefore, the switch 71a will not respond. In the case of the comparative example of input device A, therefore, unless the luminary key portion 51 is pressed harder (deeper) than the nonluminous key portions 52b-52d, the pressing section 53a does not press the switch 71a hard enough to activate the switch 71a. Thus, a user might feel that the luminary key portion 51 is inferior in tactility.

On the other hand, in this embodiment, the luminous key portion 51 is supported by the third elastic portion 58a in addition to the first and second elastic portions 57a1 and 57a2. Therefore, the input key member 50 is higher in rigidity across the area which is on the opposite side (right side in parts (a) and (b) of FIG. 5 of the luminary key portion 51 from the pressing section 53a. Therefore, as a user presses down the luminary key portion 51, the pressing section 53a presses on the top surface of the switch 71a in the roughly vertical direction. Therefore, the luminary key portion 51 remains the same (excellent) in tactility, because the luminary key portion 51 descends with the top surface of the luminary key portion 51 remaining parallel to the electric circuit board 70.

As described above, according to this embodiment, it is possible to place the light emitting element 72 directly below the transparent area B of the luminary key portion 51. Therefore, it is possible to make the luminary key portion 51 better in terms of how it looks when it is illuminated. Further, the input key member 50 is provided with the third elastic portion 58a which is asymmetrical in shape and positioning, in addition to multiple elastic portions by which the luminary key portion 51 is supported in a conventional input key member. It is possible to provide an input device which is classier in tactility (usability) than a conventional one, without the cost increase attributable to the need for additional components.

In the above-described first embodiment, the switch 71a was placed on the portion of the electric circuit board 70, which is offset from the center C51 of the luminary key portion 51 in terms of the first direction, that is, the left-right direction, in part (a) of FIG. 5. Further, in terms of the second direction, that is, the top-bottom direction, which is perpendicular to the first direction, the switch 71a is positioned so that it aligns with the center C51 of the luminary key portion 51. However, the first embodiment is not intended to limit the present invention in terms of the positioning of the luminary key portion 51 and switch 71a relative to each other. For example, the switch 71a and pressing section 53a may be asymmetrically positioned with reference to the center C51 of the luminary key portion 51 in terms of the left-right and/or top-bottom direction. Also in the first embodiment, a fourth elastic portion 58b is provided in addition to the third elastic portion 58a. Referring to FIG. 8, a center C53a of the pressing portion (center of portion to be pressed) is positioned on the bottom side of a second hypothetical line L51Y which is perpendicular to the hypothetical line L51. The third elastic portion 58a is positioned on the second elastic portion 57a2 side of the hypothetical line L51. The fourth elastic portion 58b is positioned on the opposite side of the second hypothetical line L51Y from the center C53a (center of switch 71a) of the pressing section 53a. Positioning an additional third elastic portion 58a or the like as described above can further improve the luminary key portion 51 in tactility (how the luminary key portion 51 feels as user presses the luminary key portion 51).

Also in the above-described first embodiment, the entirety of the luminary key portion 51 is an integral part of the input key member 50 (base member) which is molded in one-piece. However, the first embodiment is not intended to limit the present invention in terms of how the luminary key portion 51 is formed. For example, a part 51P1 of the luminary key portion 51 may be separately formed from the rest of the luminary key portion 51, so that it can be removably attached to the rest. Even if the luminary key portion 51 is formed in this manner, the effects of the first embodiment are the same as those described above. Further, in the case of the input device A shown in FIG. 9, only the transparent area B of the part 51P1 of the luminary key portion 51 is transparent, whereas the rest of the part 51P1 are opaque. Further, the transparent portion of the part 51P1 of the luminary key portion 51, and the opaque portion of the part 51P1 of the luminary key portion 51, are molded together, of transparent resin and opaque resin, respectively, as integral parts of the part 51P1 of the luminary key portion 51. Moreover, the part 51P1 of the luminary key portion 51 is provided with a hook-like portion 51F, which engages with the hook-like portion 51P2 of the luminary key portion 51 of the input key member 50 (base member) when the luminary key portion 51 is attached to the input key member 50 (base member).

FIG. 10 shows another embodiment of the present invention. The input key member 50 (base member) includes the main portion 50h and a part 51B of the luminary key portion 51, which are molded together as integral parts of the input key member 50 (base member) molded in one-piece. In the case of this embodiment, however, the center portion of the part 51B of the luminary key portion 51 is nothing but a hole H; the part 51B does not have the transparent portion. A referential code 51T stands for a component which makes up a part of the luminary key portion 51. The component 51T is formed of a transparent substance, and is shaped like a cap. It is attached to a the part 51B of the luminary key portion 51 to complete the luminary key portion 51. That is, the luminary key portion 51 may be a combination of the opaque part 51B and transparent component 51T.

In all the embodiments described above, the keys which are to be illuminated by a light emitting element were provided with the third elastic portion. Instead, however, the input device A may be structured so that the pressing portion of a key which is not illuminated by a light emitting element is positioned closer to the first elastic portion than to the second elastic portion, and the base member is provided with the elastic portion which corresponds to this key.

Further, in each of the above-described embodiments, the image forming apparatus was a printer. However, the preceding embodiments are not intended to limit the present invention in terms of an apparatus to which the present invention is applicable. That is, the present invention is also applicable to other image forming apparatuses than a printer. For example, the present invention is also applicable to a copying machine, a facsimile machine, and multifunction machine capable of performing two or more functions of the abovementioned machines. Moreover, the present invention is also applicable to a monochromatic image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2015-111982 filed on Jun. 2, 2015 and 2016-078999 filed on Apr. 11, 2016, which are hereby incorporated by reference herein in their entirety.

What is claimed is:

1. An inputting device having a push type key, said inputting device comprising:
   a base member including a main body portion, a key portion having an operation surface to be pushed by an operator, and a first elastic portion and a second elastic portion which connect between said main body portion and said key portion; and
   an electrical equipment substrate provided on a back side of said base member, said electrical equipment substrate including an operating portion acted on by said key portion when said key portion moves,
   wherein said operating portion is disposed at a position closer to said first elastic portion than to said second elastic portion, and
   wherein said base member is provided with a third elastic portion connecting said key portion with said main body portion or with said second elastic portion in a side of said second elastic portion with respect to a first phantom line passing through a central portion of said key portion as seen in a direction perpendicular to said operation surface.

2. An inputting device according to claim 1, wherein said third elastic portion has a length smaller than that of said first elastic portion.

3. An inputting device according to claim 1, wherein said base member is provided with a fourth elastic portion connecting said key portion with said main body portion in a side opposite from a side having a central portion of said operating portion with respect to a second phantom line perpendicular to said first phantom line, as seen in the direction perpendicular to said operation surface.

4. An inputting device according to claim 1, wherein said electrical equipment substrate is provided with a light emission element illuminating said key portion.

5. An inputting device according to claim 4, wherein said light emission element is disposed at a position closer to the central portion of said key portion than said operating portion, as seen in the direction perpendicular to said operation surface.

6. An inputting device according to claim 4, wherein said light emission element is disposed at a position which is the same as the central portion of said key portion, as seen in the direction perpendicular to said operation surface.

7. An inputting device according to claim 4, wherein said key portion is provided with a light transmitting portion for passing light from said light emission element.

8. An inputting device according to claim 4, wherein said key portion is provided with a part having a light transmitting portion for passing light from said light emission element.

9. An inputting device according to claim 1, wherein said key portion is for switching between a state in which a wireless local area network is usable and a state in which the wireless local area network is non-usable.

10. An image forming apparatus comprising:
    an image forming station configured to form an image on a recording material; and
    an inputting device having a push type key, said inputting device including:
      a base member including a main body portion, a key portion having an operation surface to be pushed by an operator, and a first elastic portion and a second elastic portion which connect between said main body portion and said key portion; and
      an electrical equipment substrate provided on a back side of said base member, said electrical equipment substrate including an operating portion acted on by said key portion when said key portion moves,
      wherein said operating portion is disposed at a position closer to said first elastic portion than to said second elastic portion, and
      wherein said base member is provided with a third elastic portion connecting said key portion with said main body portion or with said second elastic portion in a side of said second elastic portion with respect to a phantom line passing through a central portion of said key portion as seen in a direction perpendicular to said operation surface.

11. An image forming apparatus according to claim 10, wherein said electrical equipment substrate is provided with a light emission element illuminating said key portion.

12. An image forming apparatus according to claim 11, wherein said light emission element is disposed at a position closer to the central portion of said key portion than said operating portion, as seen in the direction perpendicular to said operation surface.

13. An image forming apparatus according to claim 11, wherein said light emission element is disposed at a position which is the same as the central portion of said key portion, as seen in the direction perpendicular to said operation surface.

14. An image forming apparatus according to claim 11, wherein said key portion is provided with a light transmitting portion for passing light from said light emission element.

15. An image forming apparatus according to claim 11, wherein said key portion is provided with a part having a light transmitting portion for passing light from said light emission element.

16. An image forming apparatus according to claim 10, wherein said key portion is for switching between a state in which a wireless local area network is usable and a state in which the wireless local area network is non-usable.

17. An inputting device having a push type key, said inputting device comprising:
   a base member including a key portion having an operation surface to be pushed by an operator; and
   an electrical equipment substrate provided on a back side of said base member, said electrical equipment substrate including an operating portion acted on by said key portion when said key portion moves, and a light emission element illuminating said key portion,
   wherein said light emission element is disposed at a position overlapping with a central portion of said key portion as seen in a direction perpendicular to said operation surface, and
   wherein said operating portion is disposed at a position deviated from the central portion of said key portion as seen in the direction perpendicular to said operation surface.

18. An inputting device according to claim 17,
   wherein said base member includes a main body portion and a first elastic portion and a second elastic portion which connect between said main body portion and said key portion,
   wherein said operating portion is disposed at a position closer to said first elastic portion than to said second elastic portion, and
   wherein said base member is provided with a third elastic portion connecting said key portion with said main body portion or with said second elastic portion in a side of said second elastic portion with respect to a phantom line passing through the central portion of said key portion as seen in the direction perpendicular to said operation surface.

19. An image forming apparatus comprising:
   an image forming station configured to form an image on a recording material; and
   an inputting device having a push type key, said inputting device including:
      a base member including a key portion having an operation surface to be pushed by an operator; and
      an electrical equipment substrate provided on a back side of said base member, said electrical equipment substrate including an operating portion acted on by said key portion when said key portion moves, and a light emission element illuminating said key portion,
      wherein said light emission element is disposed at a position overlapping with a central portion of said key portion as seen in a direction perpendicular to said operation surface, and
      wherein said operating portion is disposed at a position deviated from the central portion of said key portion as seen in the direction perpendicular to said operation surface.

20. An image forming apparatus according to claim 19,
   wherein said base member includes a main body portion and a first elastic portion and a second elastic portion which connect between said main body portion and said key portion,
   wherein said operating portion is disposed at a position closer to said first elastic portion than to said second elastic portion, and
   wherein said base member is provided with a third elastic portion connecting said key portion with said main body portion or with said second elastic portion in a side of said second elastic portion with respect to a phantom line passing through the central portion of said key portion as seen in the direction perpendicular to said operation surface.

* * * * *